(12) United States Patent
Blumenthal et al.

(10) Patent No.: US 6,912,359 B2
(45) Date of Patent: Jun. 28, 2005

(54) METHODS FOR MONITORING PERFORMANCE IN OPTICAL NETWORKS

(75) Inventors: Daniel J. Blumenthal, Santa Barbara, CA (US); Bengt-Erik Olsson, Gothenburg (SE); Giammarco Rossi, Pavia (IT); Timothy Eugene Dimmick, Oviedo, FL (US)

(73) Assignee: The Regents of the University of California, Oakland, CA (US)

( * ) Notice: Subject to any disclaimer, the term of this patent is extended or adjusted under 35 U.S.C. 154(b) by 636 days.

(21) Appl. No.: 09/949,235

(22) Filed: Sep. 7, 2001

(65) Prior Publication Data

US 2002/0044322 A1 Apr. 18, 2002

Related U.S. Application Data

(60) Provisional application No. 60/231,461, filed on Sep. 8, 2000.

(51) Int. Cl.⁷ .............................................. H04B 10/08
(52) U.S. Cl. ............................ 398/29; 398/81; 398/149
(58) Field of Search ........................... 398/29, 81, 147, 398/149, 159

(56) References Cited

U.S. PATENT DOCUMENTS

| | | | | |
|---|---|---|---|---|
| 5,742,418 A | * | 4/1998 | Mizutani et al. | 398/184 |
| 5,815,308 A | * | 9/1998 | Kim et al. | 359/341.2 |
| 6,636,661 B1 | * | 10/2003 | Zeng | 385/24 |
| 6,778,730 B2 | * | 8/2004 | Hironishi | 385/24 |
| 6,801,721 B1 | * | 10/2004 | Madsen | 398/147 |
| 2003/0103723 A1 | * | 6/2003 | Bohn et al. | 385/27 |
| 2003/0185568 A1 | * | 10/2003 | Ooi et al. | 398/81 |
| 2004/0008991 A1 | * | 1/2004 | Waarts et al. | 398/81 |

* cited by examiner

Primary Examiner—Kinfe-Michael Negash
(74) Attorney, Agent, or Firm—Greenberg Traurig, LLP; Charles Berman, Esq.

(57) ABSTRACT

A suite of optical performance monitoring (OPM) methods, based on optical subcarrier multiplexing, are described by the invention. The strength of this approach lies in the simplicity of double sideband subcarrier signals and the fact that these signals travel the complete optical path with the baseband signal of interest. The subcarrier signals can be recovered using techniques described in the application and are immune to fiber dispersion induced fading.

8 Claims, 13 Drawing Sheets

METHODS FOR MONITORING PERFORMANCE IN OPTICAL NETWORKS

RELATED APPLICATIONS

The contents of this application are related to provisional application having Ser. No. 60/231,461, filed Sep. 8, 2000. The present application claims priority to these related provisional patent application and the contents are hereby incorporated by reference in their entirety into the present disclosure.

BACKGROUND OF THE INVENTION

1. Field of the Invention

The present invention relates to optical fiber systems. Especially the present invention relates to monitoring optical states of a data channel in an optical system for high bandwidth transparent wavelength division multiplexing (WDM) networks.

2. General Background

The drive for high-bandwidth transparent WDM optical networks has spurred a need to develop new techniques to monitor channel performance and degradation without requiring optoelectronic-optic (OEO) conversion in the data path. Current optical network performance monitoring relies on SONET line terminating elements (LTEs) to determine the bit error rate (BER) and Q-factor from bits interleaved within the SONET frame or simple loss of signal (LOS) using power monitoring fiber taps. Causes of signal-to-noise (SNR) degradation and distortion are calculated by measuring the characteristics of optical network elements (e.g. fiber dispersion) in advance. However, next generation optical networks will be more dynamic (e.g. dynamic wavelength routing) and signals will traverse different complex paths consisting of fibers, amplifiers, optical add/drop multiplexers, optical crossconnects, etc. At any point within the network, the collective group of wavelength channels will have a different history including path and details of network elements that were transversed. Additionally, degradation and environmental changes will make it very difficult to manage these networks based on statically mapped network element properties.

Optical performance monitoring (OPM) is an approach that ideally allows measurement of channel performance and degradation to be performed without knowledge of the origin or transport history of the data. Direct measurements of, for example, BER are difficult as only a small percentage of optical power can be monitored without degrading the through signal. Yet sufficient power must be available for the monitor to be able to perform as well as the end point receiver in determining the BER. An alternative approach is to monitor various qualities of the data (e.g. chromatic dispersion, polarization mode dispersion, crosstalk, jitter, extinction ratio, channel power, SNR) indicative of channel degradation and compute the BER or performance from these measures. It may also be desirable to characterize certain parameters of a data channel for corrective measures (such as dispersion compensation) or for network management purposes such as downgrading a channels bit rate or reporting degradation to the network management system (NMS) for alarm correlation and fault location.

In the OPM approach, the monitoring technique needs to operate on a portion of the signal that has traversed the optical path with the baseband signal of interest. Optical subcarrier multiplexed signals (OSCM) are a promising candidate to fulfill this requirement as they can be placed close to each optical carrier but still out of band. The signal can be monitored without touching the baseband data yet maintaining a strong correlation with the degradation mechanisms. Moreover OSCM can be used to carry control information in a circuit switched network or label information in packet based architectures.

In comparison with transmitting control on a separate wavelength, the subcarrier per wavelength approach supports distributed network control with a synchronous recovery of wavelength identification, wavelength power, and control data, using a common circuit. It requires only a single laser at each user transmitter and a single photodetector at each monitoring or detection point. The subcarrier portions of the transmitters and receivers can be fabricated using low cost monolithic-microwave integrated circuit (MMIC) technology that has been developed for wireless communications.

Furthermore, crosstalk due to fiber four-wave mixing is low as there is a single subcarrier per wavelength and the relative power of the subcarrier component is much less than the baseband component of the optical signal. Signal cancellation and fading due to dispersion can be overcome using suppressed carrier receivers and single sideband subcarrier modulation techniques. Monitoring of many subcarrier channels using a single photodetector can be achieved with new high power traveling wave photodetector designs.

SUMMARY OF THE INVENTION

Accordingly, a suite of optical performance monitoring (OPM) methods, based on optical subcarrier multiplexing, are described by the invention. The strength of this approach lies in the simplicity of double sideband subcarrier signals and the fact that these signals travel the complete optical path with the baseband signal of interest. The subcarrier signals can be recovered using techniques described in the application and are immune to fiber dispersion induced fading. A complete set of subcarrier multiplexed signals can be recovered from a WDM optical stream using a single photodetector and simple, low-cost monolithic microwave integrated circuits (MMIC).

Accordingly, in one embodiment of the present invention, a method for monitoring optical dispersion of a data channel without recovering a baseband signal comprises (i) dividing an optical signal into a first signal component and a second signal component; (ii) filtering the first signal component to obtain a first sideband signal of a subcarrier signal; (iii) filtering the second signal component to obtain a second sideband signal of the subcarrier signal; and (iv) detecting a relative phase delay between the first sideband signal and the second sideband signal of the subcarrier signal. The relative phase delay provides a fine measure of optical dispersion of a data channel.

Furthermore, a coarse measure of optical dispersion of a data channel may also be concurrently determined, along with the fine measure of optical dispersion, by (i) applying the first sideband signal to a demodulator to obtain a first demodulated signal; (ii) applying the second sideband signal to a demodulator to obtain a second demodulated signal; (iii) recovering a first clock signal from the first demodulated signal; (ii) recovering a second clock signal from the second demodulated signal; (iv) applying the first clock signal to a phase detector; and (v) applying the second clock signal to the phase detector. The output from the phase detector provides a coarse measure of optical dispersion.

Accordingly, in another embodiment of the present invention, a method for monitoring optical dispersion of a data channel without recovering a baseband signal comprises, (i) measuring signal power for a first subcarrier signal, wherein the first subcarrier signal has a first predetermined subcarrier frequency; (ii) measuring signal power for a second subcarrier signal, wherein the second subcarrier signal has a second predetermined subcarrier frequency; and (iii) determining a ratio between the signal power for the first subcarrier signal and the signal power for the second subcarrier signal. The ratio of signal powers is a function of the optical dispersion of a data channel.

Accordingly, in another embodiment of the present invention, a method for monitoring data channel power without recovering a baseband signal comprises, (i) applying an optical signal from a data channel to an input of a photodiode, wherein the optical signal includes at least one subcarrier signal; (ii) extracting the at least one subcarrier signal; and (iii) monitoring power in the at least one subcarrier signal.

Accordingly, in another embodiment of the present invention, a method for monitoring optical channel signal to noise ratio without recovering a baseband signal comprises, (i) determining a ratio of carrier to noise power; and (ii) computing an optical signal to noise power ratio, wherein there exists a predetermined relation between the optical channel signal to noise ratio and the ratio of carrier to noise power.

Accordingly, in another embodiment of the present invention, a method for estimating an optical channel signal to noise ratio comprises, (i) determining a scalar product between the polarization state of an optical carrier signal and a subcarrier signal; and (ii) computing a photocurrent for the subcarrier signal. The photocurrent provides an estimate of the optical channel signal to noise ratio.

BRIEF DESCRIPTION OF THE DRAWINGS

In order that the manner in which the above-recited advantages and objects of the invention are attained, as well as others which will become apparent, more particular description of the invention briefly summarized above may be had by reference to the specific embodiments thereof that are illustrated in the appended drawings. It is to be understood, however, that the appended drawings illustrate only typical embodiments of the invention and are therefore not to be considered limiting of its scope, for the invention may admit to other equally effective embodiments.

DETAILED DESCRIPTION OF PREFERRED EMBODIMENTS OF THE INVENTION

Figure 1:
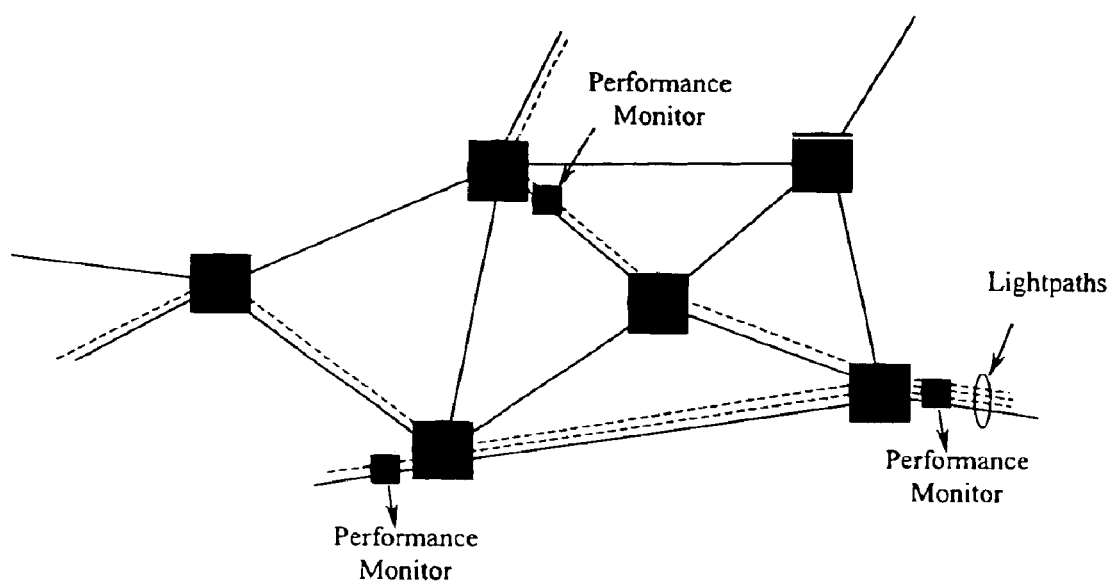
FIG. 1 is an illustration of a reconfigurable WDM optical network with various network elements and placement of the optical performance monitoring (OPM) elements.

Future WDM optical networks will utilize dynamic routing of wavelengths as "lightpaths" through optical nodes as shown in FIG. 1. It is expected that optically switching these lightpaths will have a positive impact on cost, network utilization and management in the networking layer analogous to the impact on cost that erbium-doped fiber amplifiers (EDFAs) had on regeneration in transmission links.

An important issue in network management and survivability is the ability to measure the performance of optical data, detect degradation and failures and provide means of failure location and isolation. The optical performance monitoring (OPM) approach deviates from traditional approaches in several ways. Current approaches involve quantifying link parameters (e.g. dispersion, loss) on a link-by-link basis, typically under static conditions. The OPM approach measures the condition of signals at arbitrary points within the network without detailed knowledge of the lightpath or the network elements and links that it traverses in a real-time dynamic environment. Only the resulting effects of SNR degradation and distortion are measure and utilized in determining the channel performance.

Historically, the requirement to "touch" bits at every network element has dominated network architectures. Traditional OEO regenerators (illustrated in FIG. 2a) provided a means to electronically look at every bit with tradeoffs in the cost, complexity, scalability and reliability of WDM regeneration points. However, the cost and simplicity of optical amplifiers outweighs the need to monitor bits as they passed through regenerators. Optical switches and crossconnects are used to groom traffic optically and have the potential to alleviate the need to OEO terminate every lightpath at each network element. This quality parallels the development of optical amplifiers and can drive the need for OPM techniques. OPM more closely follows the approach shown in FIG. 2b where a portion of the optical power is removed from the fiber and converted to an electronic signal for performance monitoring.

Figure 2:
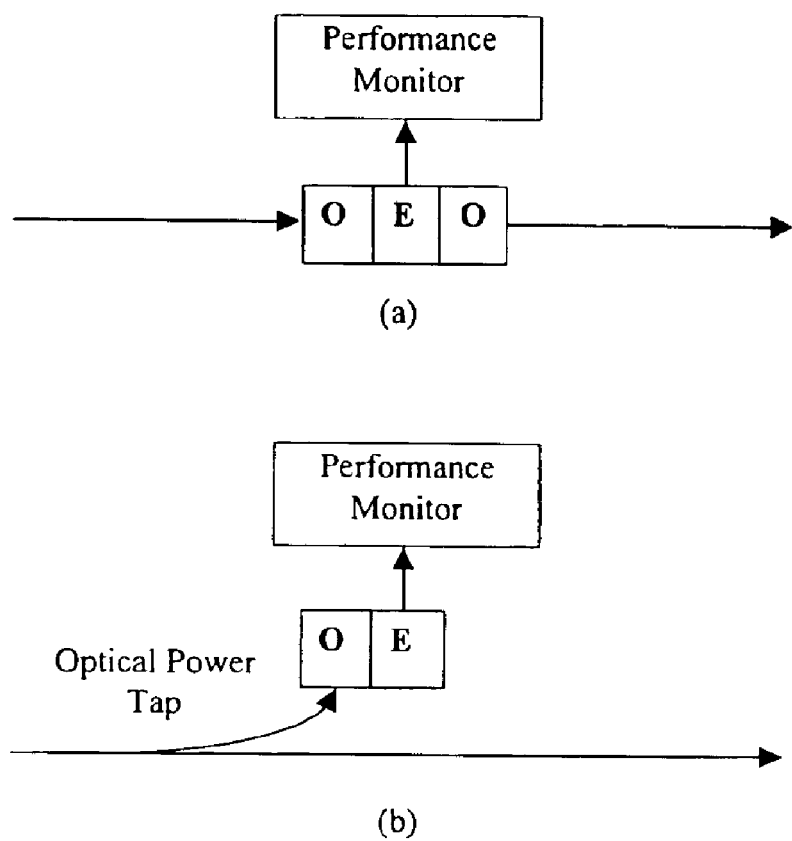
FIG. 2 shows a performance monitoring system employing a method for using (a) OEO regeneration and (b) optical power tap approaches

The problem that arises when trying to implement the approach in FIG. 2b results from the need to measure the performance with minimal disturbance to the signals in the fiber. The OE interface used at the tap must have a better sensitivity than a receiver used to recover the signal downstream. This is possible if the tap receiver is optically pre-amplified and the downstream losses and distortion are limited. In general, it is recommended that the tap receiver be as simple as possible.

The channel BER is one of the most important parameters to measure and is in general the most difficult to measure directly for a signal at the output of a power tap. Qualities of the signal other than the BER that can be measured include:

SNR and Q Factor monitoring

Extinction Ratio Monitoring

Loss and power monitoring

Dispersion monitoring (Chromatic and PMD)

Nonlinear distortion monitoring

Channel equalization

Crosstalk monitoring

Wavelength registration

Network state monitoring

Clock monitoring in 2R regenerators

Bit rate monitoring

Figure 3:
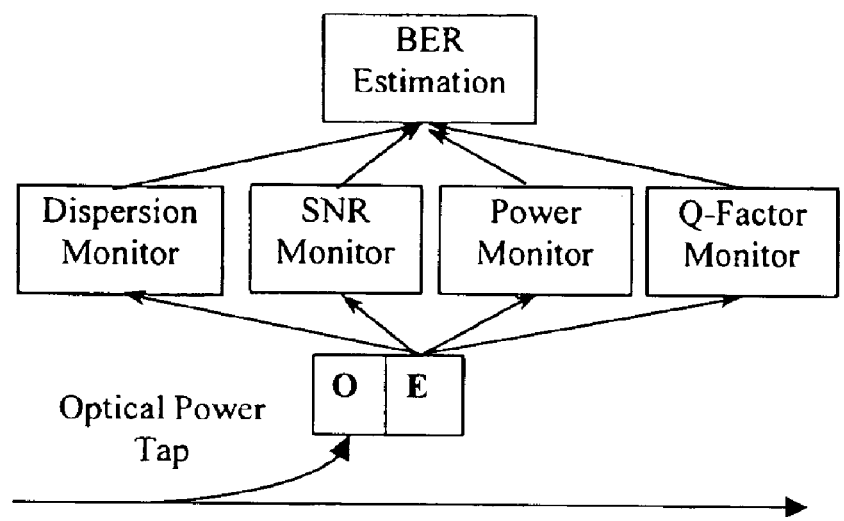
FIG. 3 depicts a potential utilization of the various OPM metrics to estimate the bit error rate (BER)

Estimation of the BER from parameters like the Q-factor can be performed if the eye closure is due to Gaussian-like noise sources only. The presence of non-Gaussian noise sources, crosstalk and distortion mechanisms will lead to errors in estimating the BER using the Q-factor. It may be possible to utilize other SNR degradation and signal distortion factors to estimate the BER as shown in FIG. 3.

The primary causes of degradation of the BER that can be monitored using OPM include: (a) Noise: Caused by random signal fluctuations that can be treated as a Gaussian process and can be signal level dependent. Examples include optical amplifier noise and laser noise. (b) Distortion: Caused by nonlinearities or fiber dispersion effects that may be signal level and pattern dependent and can lead to bursty errors and BER floors. Examples include laser, optical amplifier and fiber nonlinearities, laser diode bit pattern dependent response, receiver bit pattern dependent response, chromatic and polarization mode dispersion, in-band crosstalk, out-of-band crosstalk and phase induced intensity noise (PIIN). (c) Crosstalk: It is important to mention that interferometric and nonlinear crosstalk are bit pattern effects that may or may not be treated as noise. This depends on the number of interfering terms and the nature of the interfering signals.

Other issues that must be addressed with any performance monitoring technique include: (i) Power Detection: Techniques to identify loss of signal and changes in optical power for power equalization. Power detection must distinguish between channel loss and "strings of zeros" transmission. (ii) Frequency Monitoring: Frequency selective elements and frequency agile sources must be within 1% of channel bandwidth. This standard must be applied to stabilization of frequency dependent components.

The invention describes a suite of OPM techniques based on optical subcarrier multiplexing. The strengths of this approach lie in the simplicity of double sideband subcarrier signals and the fact that these signals travel the complete optical path with the baseband signal of interest. The subcarrier signals can be recovered using techniques described below that are immune to fiber dispersion induced fading. A complete set of subcarrier multiplexed signals can be recovered from a WDM optical stream using a single photodetector and simple, low-cost monolithic microwave integrated circuits (MMIC).

Various approaches using low frequency pilot tones have been reported for wavelength registration. However, pilot tones limit the amount of information that can be carried on the monitor to several 10 s of kHz. Additionally, the number of tones that can be placed below a digital signal is limited.

SCM Generation and Detection: Several methods have been published for the generation of hybrid baseband/SCM signals. These include combining baseband and subcarrier signals electronically followed by direct laser modulation or combining these signals electrooptically with a differentially driven Mach-Zehnder integrated-optic modulator. While both of these methods result in a degradation of the baseband data when the subcarrier is present, it is possible to minimize that penalty provided the subcarrier amplitude is sufficiently small. In the present invention the electrooptic method was used.

Figure 4:
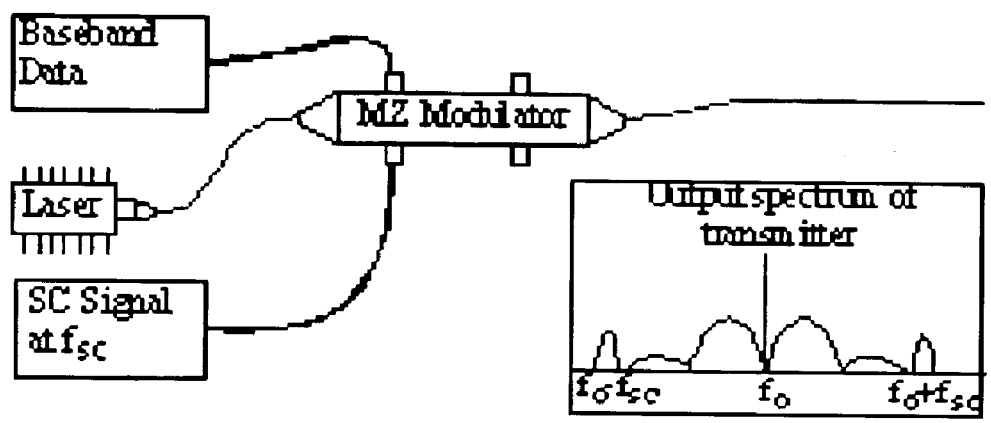
FIG. 4 shows a hybrid baseband data/subcarrier multiplexed transmitter.

A schematic diagram of the hybrid baseband/SCM transmitter is shown in FIG. 4. In the present invention, the transmitter for the baseband data and the SCM signal are encoded on the optical carrier by means of a dual-arm Mach-Zehnder $LiNbO_3$ electro optical modulator with a 3 dB bandwidth of 18 GHz.

The baseband data were encoded on one arm of the modulator, while the other arm was driven with a 16.7 GHz RF tone. In some experiments the subcarrier tone was also amplitude modulated. This system is a compact way to multiplex subcarrier and baseband data but is sub-optimal for baseband transmission. In the present experiment, a power penalty is measured to the baseband data of between 0.5 and 2 dB depending on the amplitude of the subcarrier signal relative to the baseband signal. Demultiplexing and detection of the SCM signal may be accomplished at the terminus of the baseband data or at any point within the network by tapping a small portion of the transmitted signal.

Recovery of the baseband data is easily accomplished using a standard receiver. The baseband receiver consists of a simple optical-to-electrical (O/E) converter and a low-pass filter to pass the digital baseband and reject the subcarrier channel. Detection of the SCM signal usually involves bandpass filtering followed by processing specific to the function of the signal. Optical prefiltering may also be employed in order to overcome signal degradation caused by dispersion in the network or as part of an optical performance monitor.

Channel Identification and Power Monitor: One of the most important and straightforward optical parameters to monitor is the per wavelength optical power in WDM links. Optical amplifiers tend to favor some wavelength channels at the expense of others introducing power differences. Small differences in power following one amplifier will be exaggerated as many amplifiers are often concatenated. Even carefully designed wavelength flattened links can have problems brought about by aging components.

Figure 5:
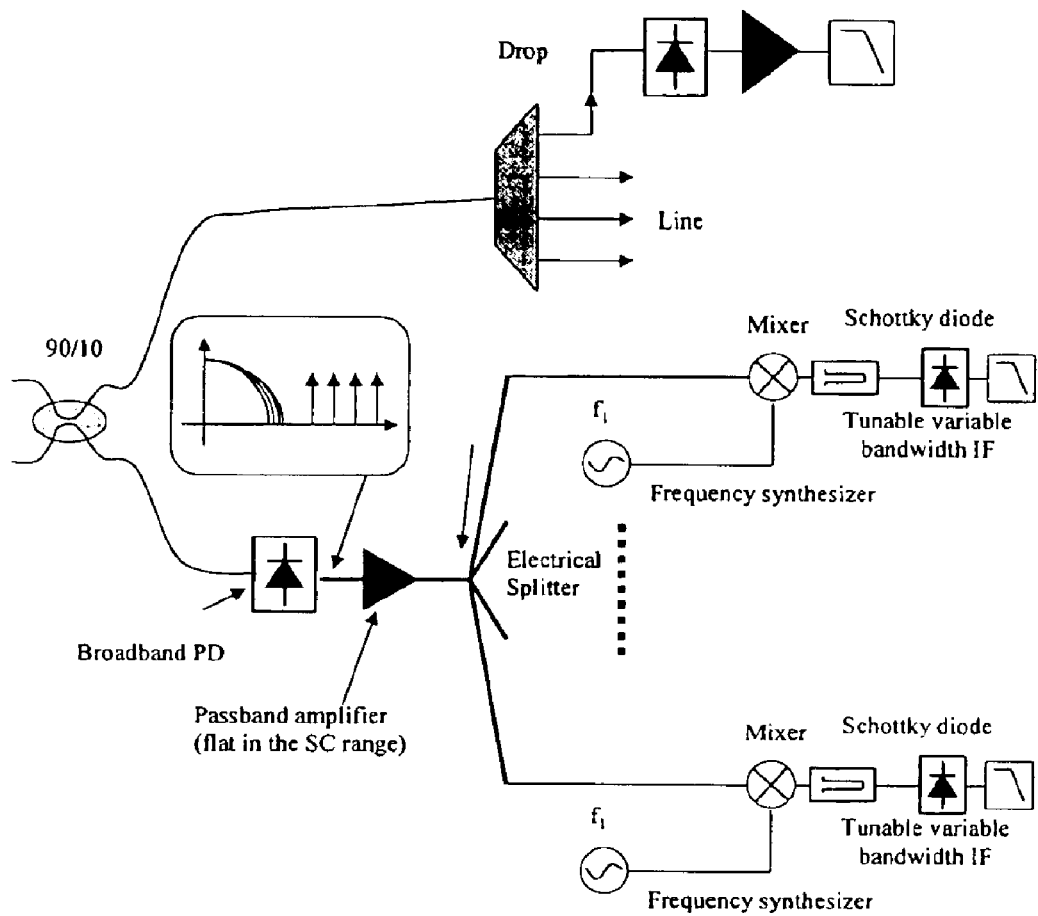
FIG. 5 shows a system employing one embodiment in the present invention for monitoring the data channel power.

An optical power monitor tap that uses high frequency subcarriers is depicted in FIG. 5. Shown in the figure is a tap capable of monitoring four wavelengths simultaneously. In this approach each wavelength carries with it a unique subcarrier frequency. This permits monitoring of all channel powers without the need for demultiplexing in the optical domain and separate detectors for each wavelength. Since the subcarrier power relative to the channel power is fixed at the transmitter, variations in the channel power due to wavelength dependent gain or loss can be immediately detected as variations in the subcarrier power. A power monitor of this type has been used within a feedback loop with an acousto-optic tunable filter to equalize the per wavelength power in a WDM experiment. Here it is required that the ratio between optical signal power and RF power in the corresponding subcarrier signal be fixed within a specified tolerance for all transmitters in the network. Such a scheme also has application to channel identification since it is possible to determine what wavelengths are present on a given link by simply detecting which subcarrier frequencies are present.

Signal to Noise Ratio Monitor: Monitoring of signal to noise ratio (SNR) on a per-channel basis is needed to implement second generation reconfigurable all optical networks. Different wavelengths follow different paths, through various elements with wavelength dependent gain or loss. As a consequence the SNR may vary from channel to channel and from point to point in the network making monitoring and control of SNR key to all optical networking.

A common method of measuring SNR relies on optical spectrum analysis wherein the noise level is measured adjacent to the signal wavelength and the OSNR is calculated by interpolation. The accuracy of this technique is degraded by the presence of multiple filtering elements in the signal path. Spectral shaping caused by these elements leads to unbearable underestimation errors.

Subcarriers provide a reliable and simple means for monitoring the OSNR. The OSNR can be determined by measuring the electrical carrier-to-noise ratio at the detector. The OSNR is given by:

$$OSNR = \sqrt{\frac{B_{ESA}}{\Delta v} \frac{CNR}{m^2}} \quad (1)$$

where CNR is the Carrier to Noise Ratio as measure with an electrical spectrum analyzer with resolution bandwidth $B_{ESA}$, is the optical bandwidth and m is the modulation depth of the subcarrier. Eqn. 1 is valid when the noise of the photodetector is negligible and the optical noise is dominated by the amplifier spontaneous-spontaneous beat noise. The resolution bandwidth of the spectrum analyzer may be reduced in order to improve the accuracy and increase the sensitivity of the monitor. However, this increases the measurement time.

When the input power is too low the photodetector electrical noise is significant and has to be calibrated out. In this regime Eqn 1 is still valid but with and effective CNR given by:

$$CNR_{eff} = \left(CNR^{-1} - \frac{N_{PD}B_{ESA}}{P_{SCM}}\right)^{-1} \quad (2)$$

where NPD is the photodetector noise power spectral density.

Figure 6:
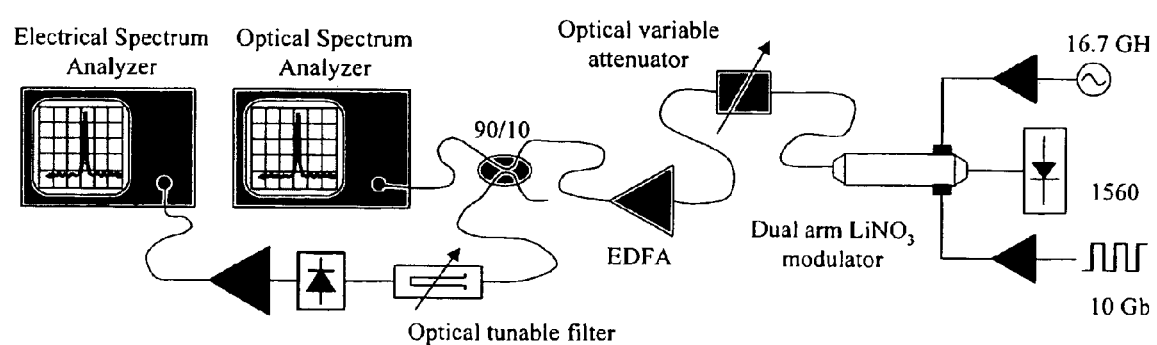
FIG. 6 depicts a system employing one embodiment in the present invention for monitoring the optical signal to noise ratio.

The experimental set-up is shown in FIG. 6. The transmitter architecture of FIG. 4 is used to perform subcarrier multiplexing. An optical variable attenuator is used to control the power injected into the EDFA to vary the output signal to noise ratio. Then a small part of the signal power is tapped out through a 90/10 coupler. A tunable filter (=0.8 nm) is used to select the proper channel. A broadband high-speed photodetector followed by a front-end amplifier is used for optoelectronic conversion. Finally an electrical spectrum analyzer (ESA) is used to measure the CNR. The OSNR is also measured with a conventional optical spectrum analyzer.

Figure 7:
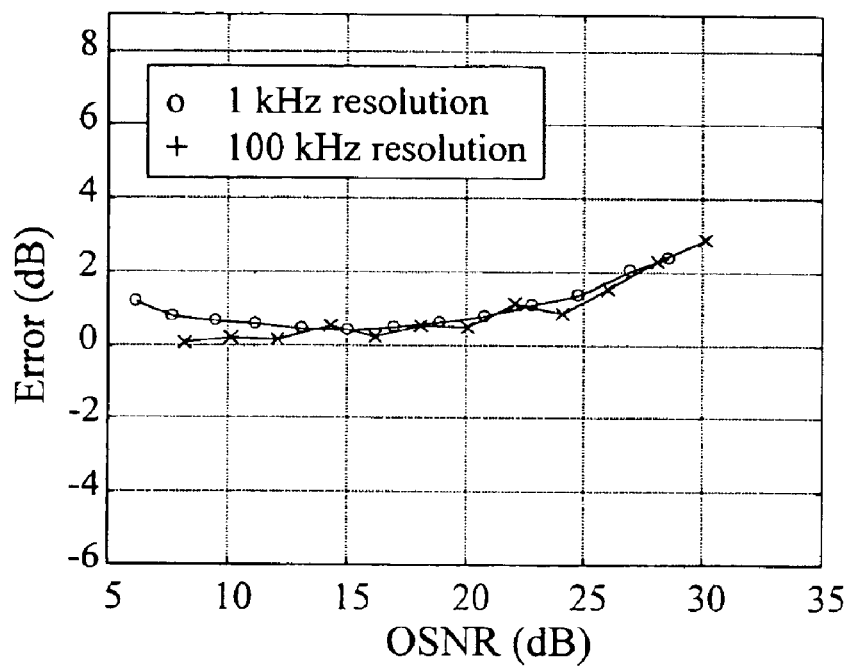
FIG. 7 is a plot of the error between the OSNR measured with the OSA and the ESA (x marker for −30 minimum power dBm 100 kHz resolution bandwidth; o marker −40 dBm, 1 kHz)
Figure 8:
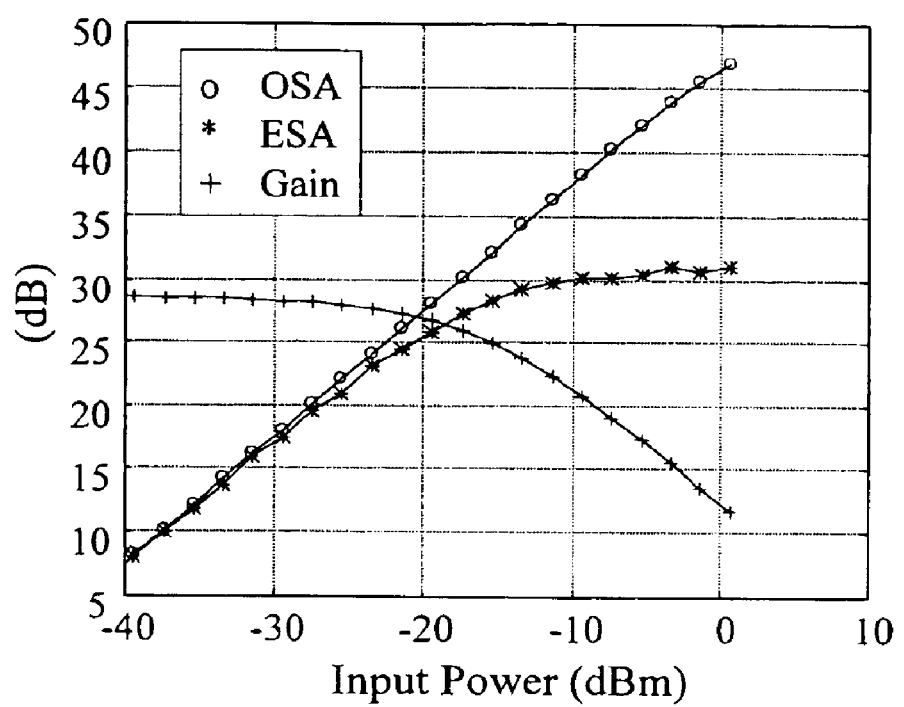
FIG. 8 is a plot of the OSNRs measured with an optical (squares) and electrical (triangles) spectrum analyzer (left y scale) and EDFA's gain (right y-scale) as a function of the EDFA input power.

The results of the measurement are reported in FIG. 7. This technique can predict the OSNR with no more than 2 dB error over almost 25 dB range and less than 1 dB where the OSNR is less than 20 dB, a critical range. The measurement is accurate even when the input power to the photodetector is changed provided that the resolution bandwidth of the photodetector is properly adjusted. For OSNR higher than 30 dB our method diverges from the optical technique since, as shown in FIG. 8, the amplifier starts to saturate and the hypothesis supporting Eqn. 1 is not valid.

Chromatic Dispersion and PMD: It is well known that fiber chromatic dispersion induces fading in double sideband subcarrier signals, which can make this type of measurement impractical for link distances beyond several 10 s of km. Possible solutions are to either transmit and detect single sideband subcarriers or to use suppressed carrier optical receivers based on optical filters. PMD causes a wavelength dependent variation of the polarization state. Therefore at the receiver the expression for single sideband subcarrier photocurrent will be:

$$I_{SCM} \sim (\vec{p}_O \cdot \vec{p}_{SCM}) m I_O \cos(\omega_{SCM} t + \phi) \quad (3)$$

where $_{SCM}$ is the subcarrier angular frequency, $I_O$ the optical carrier photocurrent and $\vec{p}_O \cdot \vec{p}_{SCM}$ the scalar product between the states of polarization of the optical carrier and of the subcarrier whose effect is to produce an effective modulation depth lower the actual one. This results in an underestimation of the OSNR. An a priori knowledge of the modulation depth together with the measurement of $I_O$ can be used to calibrate this error out.

Chromatic Dispersion Monitor: Two methods for monitoring the accumulated dispersion affecting a data channel without recovering the baseband data are described by one embodiment in the present invention. The first method is extremely simple to implement. The second method involves a more complex tap monitor but is capable of more accurately measuring very large amounts of dispersion.

Chromatic Dispersion Monitor Using Subcarrier Ratio Method: In this technique the invention takes advantage of what is usually considered a liability of subcarrier multiplexing, namely the fading of the subcarrier signal that occurs as a result of accumulated dispersion. As the subcarrier signal traverses a dispersive fiber link, the subcarrier sidebands experience a relative phase delay that increases with the accumulated dispersion. This phase delay reduces the received subcarrier power measured at the detector. If the sidebands accumulate a total phase delay the subcarrier power measured at the detector goes to zero. In a simple fiber span of loss per unit length α, length L, and dispersion coefficient D, a subcarrier signal with initial power A and frequency f will have a detected power $$P = Ae^{-\alpha L} \cos^2\left(\frac{\pi D L \lambda^2 f^2}{c}\right) \quad (4)$$

where A is an unknown constant that accounts for the loss and gain elements that the signal experiences. The received power will go to zero when $$DL = \frac{c}{2\lambda^2 f^2}. \quad (5)$$

It is important to note that Eq. 4 and Eq. 5 are only valid when subcarrier signal is not chirped. Upon examination of Eq. 5 it is seen that higher frequency subcarrier signals fade faster (with less accumulated dispersion) than lower frequency signals. To illustrate this effect Eq. 4 is plotted in FIG. 9a as a function of L for subcarrier frequencies of 9.6 GHz and 10.4 GHz. For the plot we let $\lambda=1550$ nm, $D=18$ ps/nm·km and $\alpha_{dB}=0.2$ km$^{-1}$.

Figure 10:
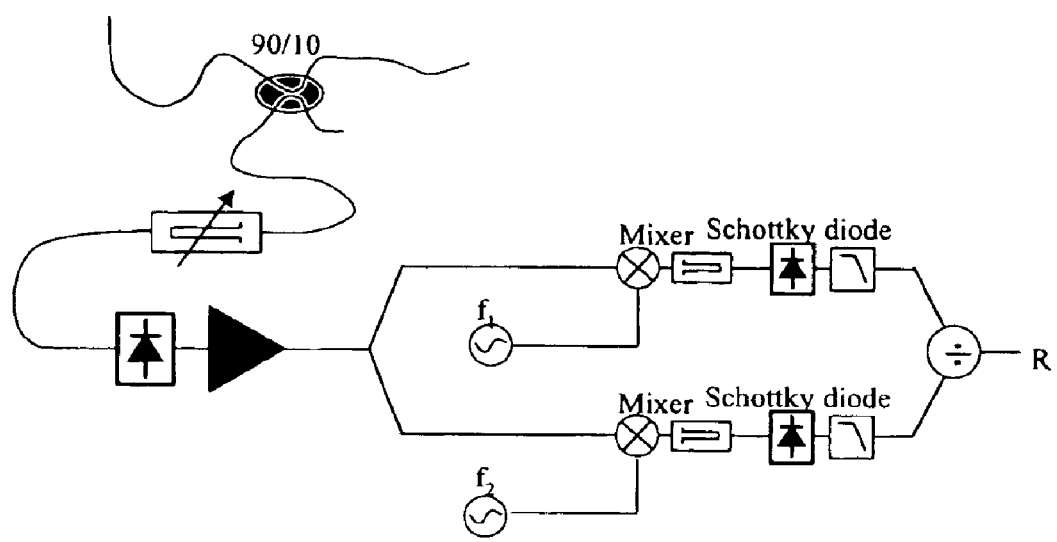
FIG. 10 schematically illustrates a system employing one embodiment in the present invention for the subcarrier ratio method dispersion monitor.

If a subcarrier signal at the transmitter is composed of two subcarrier frequencies $f_1$ and $f_2$, then it is possible to measure the accumulated dispersion this signal (and the baseband data signal as well) has experienced by simply measuring the ratio of the electrical power at frequency $f_1$ to that at frequency $f_2$ received at the monitor point. This way it is possible to avoid the dependence of measured power upon the unknown factor A. A dispersion monitor tap that implements this technique is shown in FIG. 10. The output of the dispersion monitor is expressed as a ratio and is given by $$R = \cos^2\left(\frac{\pi DL\lambda^2 f_1^2}{c}\right) \Big/ \cos^2\left(\frac{\pi DL\lambda^2 f_2^2}{c}\right) f_1 < f_2 \quad (6)$$

Figure 9:
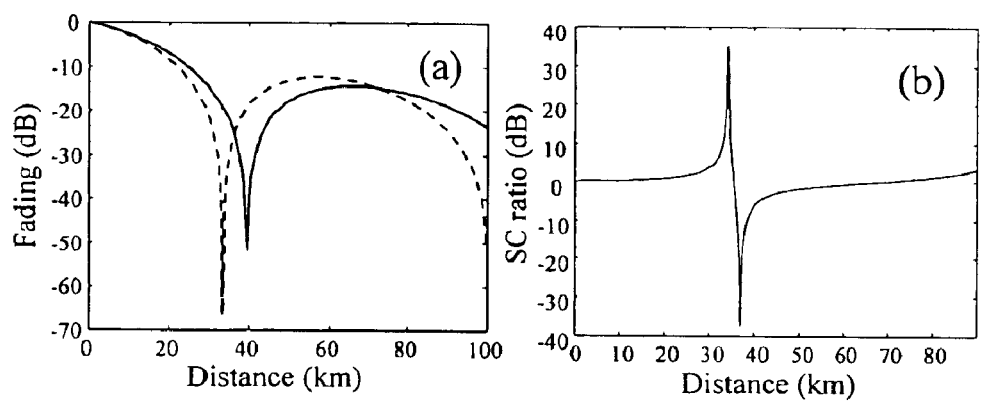
FIG. 9 depicts plots of the simulated results of subcarrier fading for, (a) frequencies $f_1$ and $f_2$, and (b) the ratio $f_1/f_2$.

Equation. 6 is plotted in FIG. 9b as a function of L with $\lambda=1550$ nm, $D=18$ ps/nm·km, $f_1=9.6$ GHz and $f_2=10.4$ GHz. The accumulated dispersion is uniquely determined by Eqn. 6 up to a maximum DL product of $c/2\lambda^2 f_2^2$.

Chromatic Dispersion Monitor Using Optical Side-band Suppression Method: In this technique a subcarrier signal is combined with the baseband data at the transmitter as illustrated in FIG. 1. The subcarrier tone is amplitude modulated by a low frequency signal. The transmitter architecture is used to encode labels on data packets. The spectrum of the transmitter output (depicted in the inset to FIG. 4) shows the double sideband nature of the subcarrier signal. When this signal is propagated through dispersive fiber, the dispersion induces a relative time delay between the subcarrier sidebands as given by, $$\Delta t = f_{SC}\frac{\lambda^2}{c}DL \quad (7)$$

By measuring the relative phase delay between the sidebands, it is possible to determine the amount of dispersion (DL product) the baseband signal has experienced.

It is clear from Eqn. 7 that by choosing a subcarrier frequency that is large compared to the bit rate of the underlying data, very sensitive measurement of accumulated dispersion is possible. Unfortunately, measurement of the subcarrier phase delay alone limits the maximum dispersion that can be measured to the period of the subcarrier signal. It is possible to overcome this limit to measurement of high values of dispersion by measuring the delay experienced by the relatively low frequency modulation applied to the subcarrier signal. In this case the time delay between the modulation on the upper and lower sidebands is given by, $$\Delta t = 2f_{SC}\frac{\lambda^2}{c}DL \quad (8)$$

In this way the range of the measurement is extended to delays comparable with the period of the modulation applied to the subcarrier signal, much longer than in the previous case.

Figure 11:
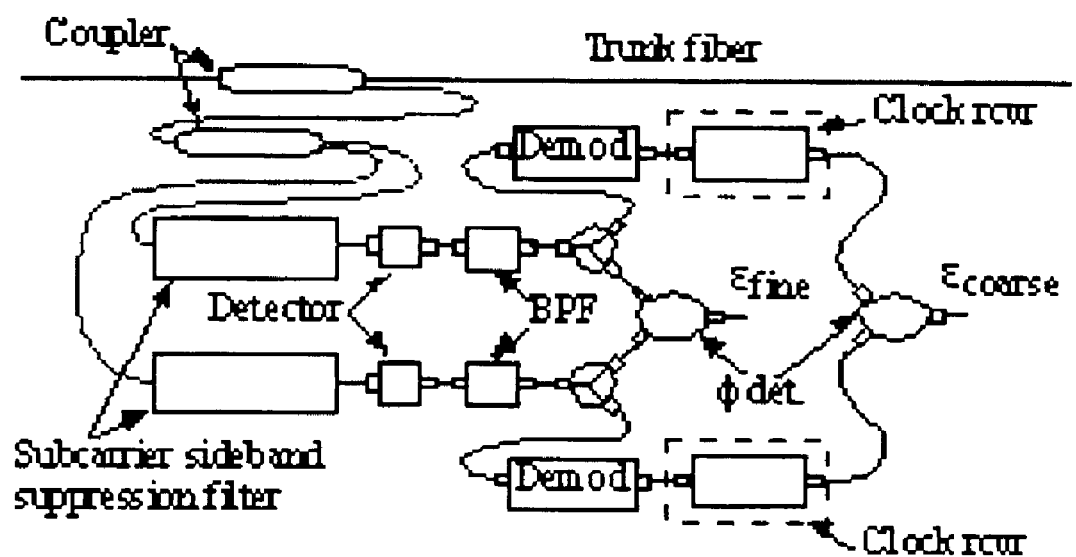
FIG. 11 is a system diagram, illustrating a system employing one embodiment in the present invention, for optical sideband suppression dispersion monitor, BPF=electrical bandpass filters, coarse and fine are outputs indicating the dispersion affecting the optical signal.

The tap architecture we developed for monitoring accumulated dispersion combines these two techniques to make possible the measurement of a wide range of dispersion with high resolution. A schematic diagram of the tap architecture is shown in FIG. 11. Referring now to the figure, a portion of the optical signal is removed from the trunk fiber, divided into two and transmitted through optical filters that suppress the upper and lower sidebands, respectively. Following the filtering, both signals are detected and the baseband data is removed using electrical bandpass filters. Each of these signals is then further divided with one output providing an input to a phase detector and the other output being directed to an amplitude demodulator. The phase detector produces a signal proportional to the phase difference between the subcarrier signals. This provides a fine measurement of dispersion as explained earlier, according to Eqn. 7.

The outputs of the amplitude demodulators are then directed to a second phase detector that provides a coarse measurement of dispersion. The coarse measurement may be used to resolve phase ambiguities in the fine measurement. A clock recovery step is only necessary when data is encoded on the subcarrier. In that case the recovered clock is input to the second phase detector to obtain the coarse measurement.

Several experiments were conducted to validate this approach. The transmitter in the experiment made us of an 18 GHz LiNbO$_3$ Mach-Zehnder modulator to simultaneously encode baseband 2.5 Gb/s data and a 16.4 GHz subcarrier on a 1560 nm wavelength DFB laser. The subcarrier was amplitude modulated with a dc offset, 410 MHz sinusoidal tone.

The optical signal was propagated through varying lengths of step index, single mode fiber to simulate different DL products. At the end of the link the signal was optically amplified and split into two. On one arm the baseband data were detected, while the other was input to the dispersion monitor. The dispersion monitor followed the design illustrated in FIG. 11 with the exception that following the electrical bandpass filters the signals were amplified and input to a sampling oscilloscope. The waveforms were acquired with the oscilloscope and transferred to a computer where the phase detection and demodulation functions were performed in software. The most critical elements in the dispersion monitor are the optical filters that perform the sideband rejection. In the present experiments, these were tunable bandpass filters (FWHM equal to 0.2 nm) adjusted to provide maximum rejection of the unwanted sideband while producing minimum attenuation of the desired sideband. One of these filters performed much worse than the other. The upper filter provided 24.3 dB of rejection but the lower filter provided only 14.8 dB of rejection.

Figure 12:
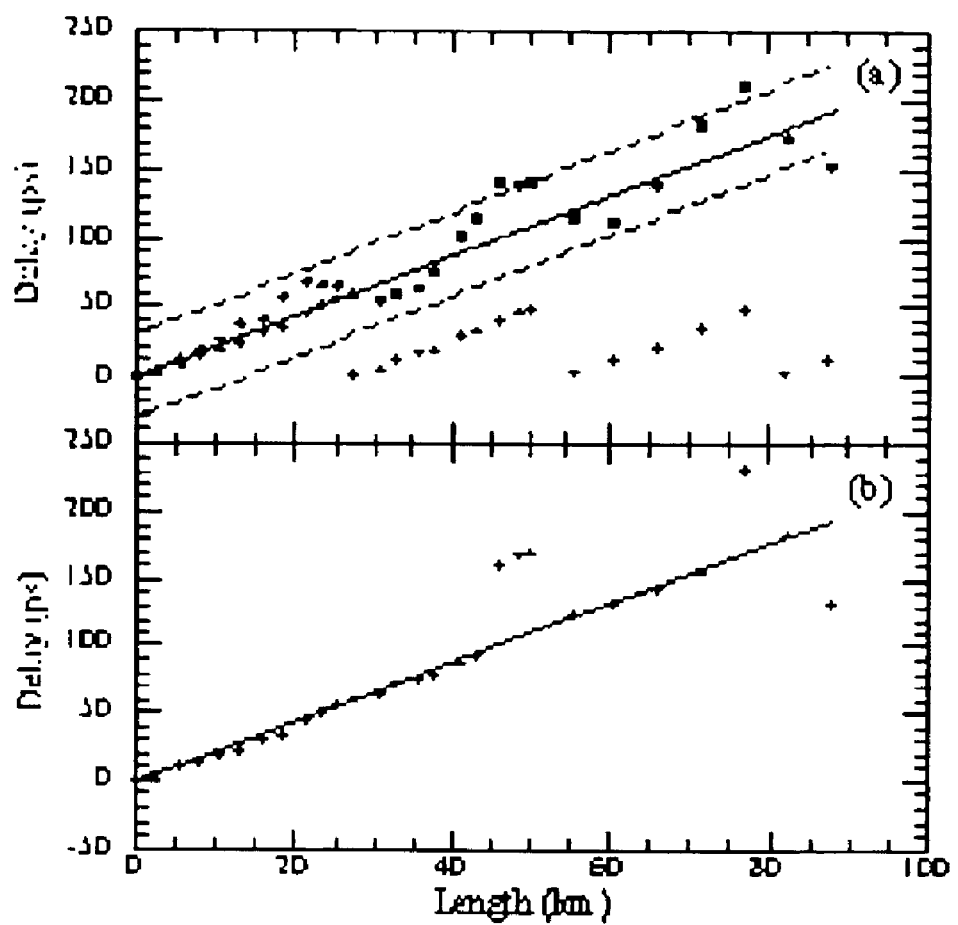
FIG. 12 are the plots for the results for (a) measured coarse delay divided by two ( ) and fine delay ( ) plotted as a function of fiber length. The solid line is the theoretical delay whereas the dashed lines are upper and lower bounds for the course measurements, (b) fine delay vs. fiber length after it has been unwrapped and the ambiguities resolved.

FIG. 12 shows the results of the demonstration of the dispersion monitor. In FIG. 12a the coarse and fine delays are plotted as a function of fiber length. Also plotted in the figure (the solid line) is the theoretical curve given by Eqn. 7. The coarse delay has been divided in two (Eqn. 7 and Eqn. 8 differ by a factor of two) so that both the coarse and the fine measurements can be compared to the same theoretical curve. The dashed lines are upper and lower bounds for the coarse measurement obtained by adding (subtracting) one half of the subcarrier period to (from) the theoretical curve. Provided the coarse delay measurements fall within these bounds it is possible to correctly determine the proper order of the fine phase measurements. FIG. 12b shows the fine phase data after it has been unwrapped. Evident in the figure are some errors that resulted from coarse phase measurements that exceeded the limits shown in FIG. 12a. It is determined through system simulations that these errors are a direct result of the poor sideband extinction obtained from the sideband rejection filter.

Figure 13:
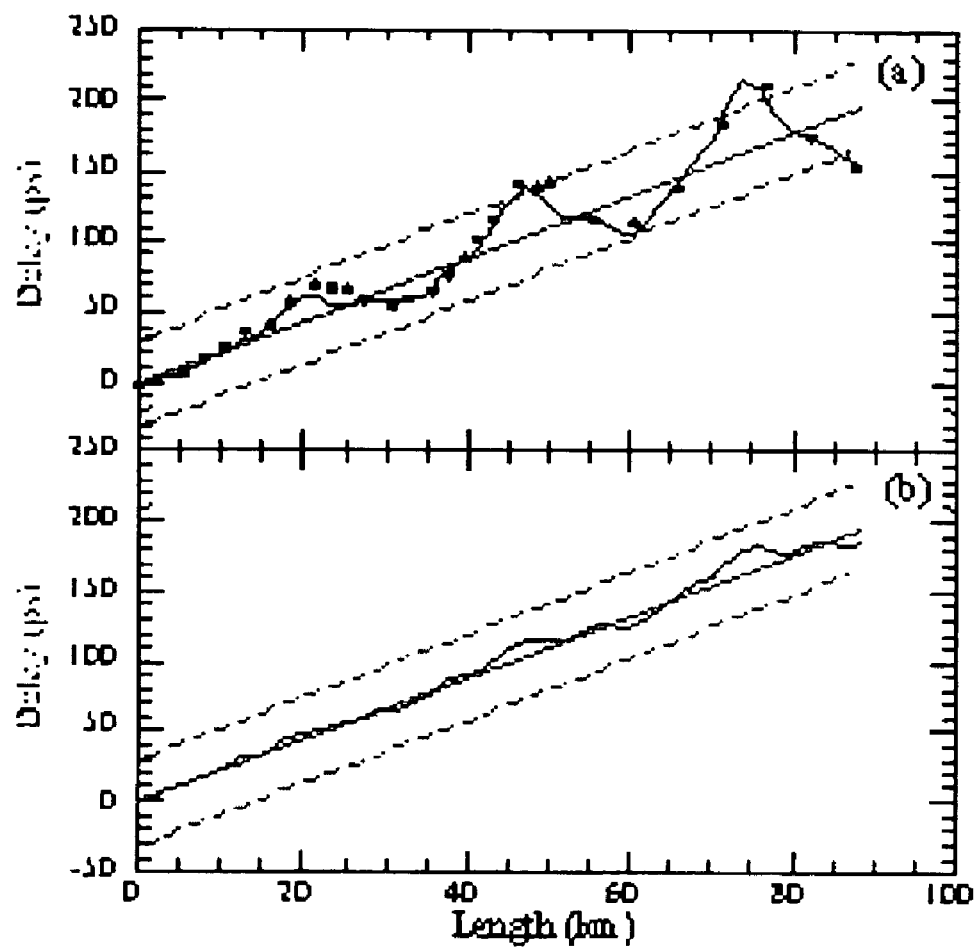
FIG. 13 are the plots for the results of simulation and experiment (a) measured coarse delay ( ) compared to the results of a simulation (solid line), (b) simulation showing predicted coarse phase measurement with optical filters providing 30 dB of sideband rejection.

FIG. 13 shows the results of the present simulations. In FIG. 13a the measured results are shown as points and the solid line is the output of the simulator. Excellent agreement between simulation and experiment is obtained. FIG. 13b shows the coarse delay as a function of length that would be obtained (according to our simulation) with filters that provide 30 dB of sideband suppression. Results from the simulator show that using the coarse measurement it is possible to resolve the ambiguities in the fine measurements to a time delay equal to the full period of the modulation applied to the subcarrier. This delay is equivalent to that produced by about 500 km of standard fiber or an equivalent DL product of 9167 ps/nm.

In summary, the invention desribes the concept of optical performance monitoring using optical subcarriers where the health of WDM channels may be determined without prior knowledge of the data route and network elements that a lightpath traverses. This approach is critical to next generation WDM dynamically reconfigurable networks where the history of traffic at any point is unknown and the dependence on OEO regenerators is decreased. Experimental results for a set of OPM functions including power monitoring, wavelength registration, SNR monitoring and chromatic dispersion monitoring. OPM techniques can be used to report degradation and failures to network management systems for fault isolation and network restoration.

While the specification describes particular embodiments of the present invention, those of ordinary skill can devise variations of the present invention without departing from the inventive concept. For example, in the tap for power monitor, each of the mixers may use different subcarrier frequencies with a single fixed bandpass filter following the mixer. Multiple subcarrier frequencies may be employed in the case of the optical signal to noise ratio monitor. In the case of the subcarrier ratio method for dispersion monitoring, a single frequency may be used at the input port of each of the mixers. The output from each of the mixers may be then applied to a tunable bandpass filter.

The disclosure claims the methods, the systems, and the apparatuses for monitoring the optical performance in an optical channel.

We claim:

1. A method for monitoring optical dispersion of a data channel without recovering a baseband signal, the method comprising the steps of:
   dividing an optical signal into a first signal component and a second signal component;
   filtering the first signal component to obtain a first sideband signal of a subcarrier signal;
   filtering the second signal component to obtain a second sideband signal of the subcarrier signal;
   detecting a relative phase delay between the first sideband signal and the second sideband signal of the subcarrier signal; and
   said relative phase delay providing a fine measure of optical dispersion of a data channel.

2. The method according to claim 1, further comprising the steps of:
   applying the first sideband signal to a demodulator to obtain a first demodulated signal; and
   applying the second sideband signal to a demodulator to obtain a second demodulated signal.

3. The method according to claim 2, further comprising the steps of:
   recovering a first clock signal from the first demodulated signal; and
   recovering a second clock signal from the second demodulated signal.

4. The method according to claim 3, further comprising the steps of:
   applying the first clock signal to a phase detector;
   applying the second clock signal to the phase detector; and
   wherein said phase detector provides a coarse measure of optical dispersion.

5. The method according to claim 1, wherein the optical dispersion induces a relative time delay of about $t=f_{sc}^2 DL/C$.

6. The method according to claim 1, wherein the optical dispersion, due to a low frequency modulation of the subcarrier signal, induces a relative time delay of about $t=2f_{sc}^2 DL/C$.

7. The method according to claim 1, wherein the subcarrier frequency is large compared to the bit rate of data in the data channel.

8. A system for monitoring optical dispersion of a data channel without recovering a baseband signal, the system comprising:
   means for dividing an optical signal into a first signal component and a second signal component;
   a first filter for filtering the first signal component to obtain a first sideband signal of a subcarrier signal;
   a second filter for filtering the second signal component to obtain a second sideband signal of the subcarrier signal;
   a detector for detecting a relative phase delay between the first sideband signal and the second sideband signal of the subcarrier signal; and
   means for providing the relative phase delay to determine a fine measure of optical dispersion of a data channel.

* * * * *

UNITED STATES PATENT AND TRADEMARK OFFICE
CERTIFICATE OF CORRECTION

PATENT NO. : 6,912,359 B2
DATED : June 28, 2005
INVENTOR(S) : Daniel J. Blumenthal et al.

It is certified that error appears in the above-identified patent and that said Letters Patent is hereby corrected as shown below:

Column 1,
Line 12, please add the following acknowledgement as follows:
-- This invention was made with Government support under Grant No. ECS9896283 awarded by the National Science Foundation. The Government has certain rights in this invention. --.

Signed and Sealed this

Twenty-ninth Day of November, 2005

JON W. DUDAS
*Director of the United States Patent and Trademark Office*